United States Patent [19]

Miyabayashi et al.

[11] Patent Number: 4,945,014
[45] Date of Patent: Jul. 31, 1990

[54] SECONDARY BATTERY

[75] Inventors: Mitsutaka Miyabayashi; Toshifumi Nishii; Hiroshi Yui, all of Yokkaichi; Kuniaki Inada, Tokyo; Katsuji Ikeda, Tokyo; Hiroyoshi Nose, Tokyo; Kenji Tsuchiya, Tokyo, all of Japan

[73] Assignees: Mitsubishi Petrochemical Co., Ltd.; Toshiba Battery Co., Ltd., both of Tokyo, Japan

[21] Appl. No.: 305,795

[22] Filed: Feb. 2, 1989

[30] Foreign Application Priority Data

| Feb. 10, 1988 [JP] | Japan | 63-27419 |
| Apr. 5, 1988 [JP] | Japan | 63-82256 |
| Apr. 5, 1988 [JP] | Japan | 63-82257 |
| Oct. 31, 1988 [JP] | Japan | 63-273146 |

[51] Int. Cl.$^5$ .................. H01M 4/38; H01M 10/40
[52] U.S. Cl. .................. 429/218; 429/194; 423/445; 423/448
[58] Field of Search .............. 429/218, 194, 232; 423/45, 448, 449; 252/502; 264/29.1

[56] References Cited

U.S. PATENT DOCUMENTS

| 4,615,959 | 10/1986 | Hayashi et al. | 429/194 |
| 4,615,960 | 10/1986 | Yata | 429/194 |
| 4,617,243 | 10/1986 | Nogami et al. | 429/194 |
| 4,702,977 | 10/1987 | Hiratsuka et al. | 429/194 |
| 4,725,422 | 2/1988 | Miyabayashi et al. | 423/445 |

FOREIGN PATENT DOCUMENTS 62-226563 10/1987 Japan .

Primary Examiner—Anthony Skapars
Attorney, Agent, or Firm—Frishauf, Holtz, Goodman & Woodward

[57] ABSTRACT

There is disclosed a secondary battery having a negative electrode composed of an active substance and a carrier carrying the active substance, which comprises
(1) the active substance is lithium or an alkali metal mainly composed of lithium,
(2) the carrier is a mixture composed of
 (a) a carbonaceous material having
  (i) an atomic ratio of hydrogen/carbon of less than 0.15 and
  (ii) a spacing of (002) planes ($d_{002}$) as determined by X-ray wide angle diffraction of 3.37 Å or more and a crystallite size in the direction of c axis of 150 Å or less, and
 (b) a metal capable of forming an alloy with the active substance and/or an alloy with the active substance.

21 Claims, 6 Drawing Sheets

SECONDARY BATTERY

BACKGROUND OF THE INVENTION

This invention relates to a secondary battery, more particularly to a secondary battery which has good charge/discharge cycle characteristics, is capable of being charged/discharged with a heavy current and has high energy density.

A secondary battery in which a main component of a positive electrode is a chalcogen compound of a transition metal such as $TiS_2$, $MoS_2$, etc., and a negative electrode comprising Li or an alkali metal mainly composed of Li has a high energy density, and efforts to develop it as a commercial product have been made.

A secondary battery in which a conductive polymer such as polyacetylene, etc. is used as a positive electrode and Li or an alkali metal mainly composed of Li is used as a negative electrode material has also been studied.

However, in such secondary batteries, the following problems occur requiring improvements in the batteries for practical use.

A first problem is caused by the fact that the negative electrode material is itself a Li foil or a foil made of an alkali metal mainly composed of Li. More specifically, during discharging of the battery, Li migrates as Li ions from the negative electrode to the electrolyte, while during charging, the Li ions are electrodeposited as metallic Li again on the negative electrode, and by repeating the charging and discharging cycle, metallic Li electrodeposited as accompanied therewith becomes shaped in dendrite. The dendrite-shaped Li is an extremely active substance, and decomposes the electrolyte to result in deterioration of the charging and discharging cycle characteristic of the battery. Further, as the growth of such dendrite, finally, the metallic Li electrodeposited product shaped in dendrite will penetrate through the separator to reach the positive electrode, whereby a short circuit will occur. In other words, this is the problem that the charging and discharging life is short.

A second problem is due to the fact that the positive electrode comprises a metal chalcogen compound as the main component. More specifically, generally as the discharging depth in charging and discharging becomes deeper, deactivation of a metal chalcogen compound will proceed rapidly. As the result, the battery capacity will be lowered to great extent after several charging and discharging cycles, whereby the battery can no longer be used in a practical application.

Among them, in order to avoid the first problem, it has been attempted that for constitution of the negative electrode, a carbonaceous material obtained by calcination of an organic compound is used as the carrier, and lithium or alkali metals composed mainly of lithium is carried thereon.

By using such negative electrode, precipitation of Li dendrite can be prevented, but on the other hand, the battery having the negative electrode assembled therein has a far smaller discharging capacity as compared with a primary battery of the same size, and also the magnitude of self-discharging has not been necessarily reduced to a satisfactory extent.

Also, for solving the second problem, it has been proposed to use a solid solution of $V_2O_5$ and $P_2O_5$ as the active substance for the positive electrode (see Japanese Provisional Patent Publication No. 134561/1984). However, the battery proposed here cannot be said to have solved completely the above problems, thus leaving the problems to remain as such.

SUMMARY OF THE INVENTION

An object of the present invention, under the state of the art as described above, is to provide a secondary battery having larger battery capacity and improved self-discharging characteristic.

Another object of the present invention is to provide a non-aqueous electrolyte secondary battery, which avoids the problems as described above, has an extended charging and discharging cycle life has, excellent self-discharging resistance, and also can be produced at low cost.

The present inventors have intensively studied the negative electrode in order to solve the above problems, and consequently found that it is effective for accomplishing the objects as mentioned above if the negative electrode carries an active substance and comprises a mixture of a carbonaceous material as described below and an alloy of the active substance and/or a metal capable of forming an alloy with the active substance.

More specifically, the secondary battery of the present invention has an active substance and a negative electrode comprising a carrier carrying said active substance, characterized in that
(1) said active substance is lithium or an alkali metal mainly composed of lithium,
(2) said carrier is a mixture composed of
  (a) a carbonaceous material having
    (i) an atomic ratio of hydrogen/carbon of less than 0.15 and
    (ii) a spacing of (002) planes ($d_{002}$) as determined by X-ray wide angle diffraction of 3.37 Å or more and a crystallite size in the direction of c axis of 150 Å or less, and
  (b) a metal capable of forming an alloy with said active substance and/or an alloy with said active substance.

BRIEF DESCRIPTION OF THE DRAWINGS

FIGS. 3, 5, 7, 9 and 11 show the manners of self-discharging during storage at 20° C. in terms of the value of capacity maintenance versus the days elapsed.

DESCRIPTION OF THE PREFERRED EMBODIMENTS

Figure 1:
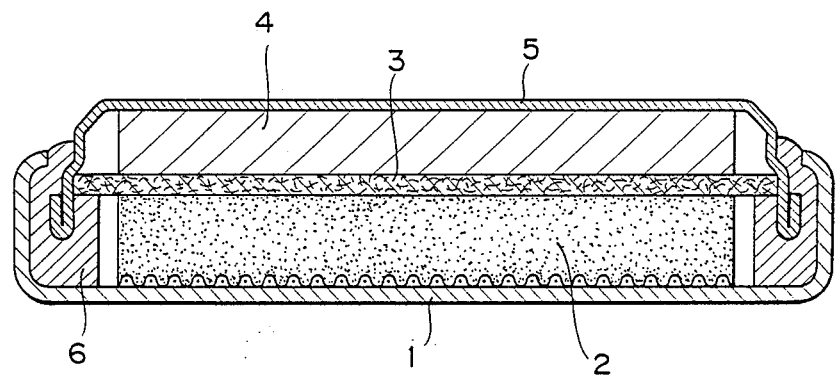
FIG. 1 is a longitudinal sectional view of a secondary battery with a button type structure which is an embodiment of the present invention.

The battery of the present invention is specific in that the negative electrode is formed as described above, and the other elements may be the same as in the secondary battery of the prior art.

In the negative electrode according to the present invention, the active substance is Li or alkali metals composed mainly of Li, and the active substance enters and leaves the negative electrode corresponding to charging and discharging of the battery.

The carrier for the active substance constituting the negative electrode in the present invention comprises a mixture of the carbonaceous material having the characteristics as described below [group (a)] and a metal capable of forming an alloy with said active substance as described below and/or an alloy with said active substance [group (b)].

First, the group (a) is to be described.

The carbonaceous material to be used in the group (a) has the characteristics of:
(i) an atomic ratio of hydrogen/carbon (H/C) of less than 0.15; and
(ii) a spacing of the (002) planes ($d_{002}$) by X-ray wide angle diffraction of 3.37 Å or more; and a crystallite size in the c-axis direction (Lc) of 150 Å or less.

In the carbonaceous material, other atoms such as nitrogen, oxygen, halogen, etc. may be also present at a proportion of preferably 7 mole % or less, more preferably 4 mole % or less, particularly preferably 2 mole % or less. H/C may be preferably less than 0.10, more preferably less than 0.07, particularly preferably less than 0.05.

The spacing of the (002) planes ($d_{002}$) may be preferably 3.39 to 3.75 Å, more preferably 3.41 to 3.70 Å, particularly preferably 3.45 to 3.70 Å, most preferably 3.51 to 3.70 Å; and the crystallite size in the c-axis direction Lc may be preferably 5 to 150 Å, more preferably 10 to 80 Å, particularly preferably 12 to 70 Å.

When either one of these parameters, namely H/C, $d_{002}$ and Lc is out of the above range, the overvoltage during charging and discharging in the negative electrode becomes large, resulting in generation of a gas from the negative electrode, whereby not only safety of the battery is remarkably impaired, but also the charging and discharging cycle characteristic is also lowered.

Further, the carbonaceous material to be used for the carrier of the negative electrode according to the present invention desirably processes the characteristics as described below.

More specifically, in the Raman spectrum analysis by use of argon ion laser beam with a wavelength of 5145 Å, the G value defined by the following formula:

$$G = \frac{\text{Integrated value of spectrum intensity in the wavenumber region of } 1580 \pm 100 \text{ cm}^{-1}}{\text{Integrated value of spectrum intensity in the wavenumber region of } 1360 \pm 100 \text{ cm}^{-1}}$$

is preferably less than 2.5, more preferably less than 2.0, particularly preferably 0.2 to less than 1.2, most preferably 0.3 to less than 1.0.

Here, the G value refers to a value obtained by dividing the integrated value of the spectrum intensity (area intensity) within the range of wavenumber 1580±100 cm$^{-1}$ by the area intensity within the range of wavenumber 1360±100 cm$^{-1}$ in the spectrum intensity curve recorded on the chart when the Raman spectrum analysis is performed by use of argon ion laser beam with a wavelength of 5145 Å for the carbonaceous material as described above, and corresponds to a measure of degree of graphitization of the carbonaceous material.

In other words, the carbonaceous material has a crystalline portion and a non-crystalline portion, and the G value can be said to be a parameter indicating the ratio of the crystalline portion in the carbonaceous structure.

Further, the carbonaceous material to be used as the carrier for the negative electrode according to the present invention desirably satisfies the following conditions.

That is, the two-fold distance $a_0 (=2d_{110})$ of the spacing ($d_{110}$) of the (110) planes in X-ray wide angle diffraction is preferably 2.38 Å to 2.47 Å, more preferably 2.39 Å to 2.46 Å; the crystallite size La in the a-axis direction is preferably 10 Å or more, more preferably 15 Å to 150 Å, particularly preferably 19 Å to 70 Å.

The carbonaceous material as described above can be obtained by heating and decomposing an organic compound generally under an inert gas stream at a temperature of 300° to 3000° C. to effect carbonization.

Specific examples of organic compounds as the starting source may include phenol resins; acrylic resins such as polyacrylonitrile, poly(α-halogenated acrylonitrile), etc.; halogenated vinyl resins such as a polyvinyl chloride, a polyvinylidene chloride, a polychlorinated vinyl chloride, etc.; a polyamideimide resin; a polyamide resin; a conjugated resin such as a polyacetylene, a poly(p-phenylene), etc.; condensed cyclic hydrocarbon compounds comprising 2 or more monocyclic hydrocarbon compounds of a three- or more membered ring such as naphthalene, phenanthrene, anthracene, triphenylene, pyrene, chresene, naphthacene, picene, perylene, pentaphene, pentacene and the like, condensed to one another, or various pitches composed mainly of a derivative such as carboxylic acid, carbocyclic acid anhydride, carboxylic acid imide of the above compounds, a mixture of the respective compounds as mentioned above; condensed heterocyclic compounds comprising at least two heteromonocyclic compounds of three-membered or more ring such as indole, isoindole, quinoline, isoquinoline, quinoxaline, phthalazine, carbazole, acridine, phenazine, phenanthridine and the like, bound mutually to each other, or comprising one or more of three-membered or more monocyclic hydrocarbon compounds bound thereto, derivatives such as carboxylic acid, carbocyclic acid anhydride, carboxylic acid imide of the above respective compounds, and further benzene and derivatives thereof such as carboxylic acid, carboxylic acid anhydride, carboxylic acid imide, namely, 1,2,4,5-tetracarboxylic acid, its dianhydride or its diimide; and the like.

Also, by use of a carbonaceous material such as carbon black, etc. as the starting source, this may be further heated to proceed appropriately carbonization to make a carbonaceous material which constitutes the carrier of the negative electrode according to the present invention.

The carbonaceous material to be used in the carrier according to the present invention, namely the group (a) is a group of particles having a volume average particle size preferably of 500 μm or less, more preferably 0.5 μm to 300 μm, particularly preferably 1 μm to 150 μm, most preferably 5 μm to 100 μm. Further, it is a preferred group of particles having a volume average particle size of 100 μm or less and a specific surface area of 1 m$^2$/g or more, more preferably a volume average particle size of 70 μm or less and a specific surface area of 3 m$^2$/g or more, particularly preferably a volume average particle size of 50 μm or less and a specific surface area of 5 m$^2$/g or more, most preferably a volume average particle size of 2 μm to 30 μm and a specific surface area of 7 m$^2$/g to 200 m$^2$/g.

If the volume average particle size exceeds 500 μm, and the specific surface area is smaller than 1 m$^2$/g, the capacity and the output as the electrode may be sometimes lowered.

As the carrier constituting the negative electrode according to the present invention, when it is prepared by using powder of the carbonaceous material as described above [group (a)] and powder of a metal capable of forming an alloy with the active substance [group (b)], it is preferred that the volume average particle size $\mu_{(A)}$ of the group (a) and the volume average particle size $\mu_{(B)}$ satisfies $\mu_{(B)} \leq \mu_{(A)}$, more preferably $\mu_{(B)} \leq 1/5\mu_{(A)}$, particularly preferably $\mu_{(B)} \leq \frac{1}{2}\mu_{(A)}$.

The particles of the above carbonaceous material have pores internally thereof, and the total pore volume thereof is preferably $1.5 \times 10^{-3}$ ml/g or more, more preferably $2.0 \times 10^{-3}$ ml/g or more, further preferably $3.0 \times 10^{-3}$ ml/g, particularly preferably $4.0 \times 10^{-3}$ ml/g or more. The average pore radius is preferably 8 to 100 Å, more preferably 10 to 80 Å, further preferably 12 to 60 Å, particularly preferably 14 to 40 Å.

The total pore volume and the average pore radius are determined by use of the constant volume method by measuring the amount of the gas adsorbed onto the sample under equilibrium pressure.

More specifically, the total pore volume and the average pore radius mean those determined as described below.

The total pore volume is determined by determining the total volume ($A_{ads}$) of the nitrogen gas adsorbed at the relative pressure $P/P_o = 0.995$ (P: vapor pressure of adsorbed gas, $P_o$: saturated vapor pressure of the adsorbed gas at the cooling temperature) determined by use of the constant volume method with a presumption that the pores are filled with, for example, liquid nitrogen, then calculating the liquid nitrogen amount ($V_{liq}$) filled in the pores according to the following formula (1):

$$V_{liq} = \frac{P_a V_{ads} V_m}{RT} \quad (1)$$

wherein $P_a$ is atmospheric pressure (kgf/cm²), T is measurement temperature (K), $V_m$ is molecular volume of the gas adsorbed (cm³/mole: 34.7 for $N_2$), and $V_{liq}$ is liquid nitrogen volume (cm³).

Next, the average pore radius ($\gamma_p$) is determined by calculating from $V_{liq}$ determined from the above formula (1) and the BET specific area (S) of the sample according to the following formula (2):

$$\gamma_p = \frac{2 V_{liq}}{S} \quad (2)$$

The pore is presumed to be shaped in a cylinder. Further, the carbonaceous material to be used in the carrier of the negative electrode of the present invention may be also desirably shaped as a fiber or rod with its average cross-sectional radius preferably of 1 mm or less, preferably 500 μm or less, more preferably 0.2 μm to 200 μm, further preferably 0.5 μm to 100 μm, particularly preferably 2 μm to 50 μm.

Also, it is preferred that these fibers, etc. of the carbonaceous material internally have pores similarly as in the case of the particulate carbonaceous material, with its total pore volume being preferably $1.5 \times 10^{-3}$ ml/g or more and its average pore radius preferably 8 to 100 Å.

The carrier for the active substance constituting the group (b) of the negative elect-ode according to the present invention comprises a mixture of the specific carbonaceous material as described above and a metal capable of forming an alloy with said active substance and/or an alloy of said substance, and therefore in the following, the metal capable of forming an alloy with the active substance and then the alloy of the active substance are to be described.

As described above, since the active substance is Li or alkali metals composed mainly of Li, it is generally preferred to use a metal capable of forming an alloy with Li.

Examples of such metal may include single substances such as aluminum (Al), lead (Pb), zinc (Zn), tin (Sn), bismuth (Bi), indium (In), magnesium (Mg), gallium (Ga), cadmium (Cd), silver (Ag), silicon (Si) boron (B), gold (Au), platinum (Pt), palladium (Pd), antimony (Sb), etc. or alloys thereof, preferably Al, Pb, Bi and Cd, more preferably Al, Pb and Bi.

Also, in the metal capable of forming an alloy with Li, other elements than the metals as mentioned above may be further contained within the range of 50 mole % or less, preferably 30 mole % or less, more preferably within the range of 10 mole % or less.

The composition (molar composition) of the alloy of the active substance is represented by $Li_xM$ (where x is molar ratio relative to the metal M). As the other metal to be used as M, one or more of the metals as mentioned above can be used. In the alloy, other elements than the metals as mentioned above may be further contained within the range of 50 mole % or less, preferably 30 mole % or less, more preferably 10 mole % or less.

In $Li_xM$, x preferably satisfies $0 < x \leq 9$, more preferably $0.1 \leq x \leq 5$, further preferably $0.5 \leq x \leq 3$, particularly preferably $0.7 \leq x \leq 2$. If x is smaller than this range, the amount of the active substance carried is to small to make the capacity of the battery smaller, while if it exceeds this range, the charge and discharge cycle characteristic of the battery is worsened.

As the alloy of the active substance ($Li_xM$), one or more kinds of alloys can be used.

As the metal capable of forming an alloy with the active substance, one or more of the above metals can be used.

The carrier for the active substance constituting the negative electrode according to the present invention may also be obtained by pyrolyzing an organometallic compound containing a metal capable of forming an alloy with said active substance and a metal in the state where the specific carbonaceous material is in contact with said organometallic compound. Examples of such organometallic compound may include organometallic compounds containing aluminum (Al), lead (Pb), zinc (Zn), tin (Sn), bismuth (Bi), indium (In), magnesium (Mg), gallium (Ga), cadmium (Cd), silicon (Si), antimony (Sb), palladium (Pd), boron (B), silver (Ag), etc., preferably organometallic compounds containing Al, Pb and Bi, particularly preferably organometallic compounds containing Al.

As the above organometallic compound, organometallic compounds represented by the formula $MR_n$ (M represents the metal as described above, and $R_n$ represents an alkyl group in number of n bindable to the metal M) are frequently used.

In the above formula, examples of the alkyl group represented by R may include a methyl group, an ethyl group, a propyl group, an isopropyl group, a butyl group, a secbutyl group, a tert-butyl group, a pentyl group, a hexyl group and the like.

Particularly preferred organoaluminum compounds may include specifically triethylaluminum, diethylaluminum hydride, tripropylaluminum, tributylaluminum, tripentylaluminum and the like.

The organometallic compounds as described above can be used singly or as a mixture of two or more compounds.

Also, the organometallic compounds as mentioned above can be used in a mixture with a small proportion of other organometallic compounds containing other metals than the metal capable of forming an alloy with the active substance.

The carrier constituting the negative electrode according to the present invention comprises a mixture of the carbonaceous material as described above, and a metal capable of forming an alloy with the active substance and/or an alloy with the active substance, and the proportion of the carbonaceous material in the mixed material may be preferably 10 to 97% by weight, more preferably 40 to 95% by weight, particularly preferably 50 to 93% by weight, most preferably 60 to 90% by weight.

The proportion of the alloy with the active substance in the mixed material may be preferably 3% by weight to less than 60% by weight, more preferably 5% by weight to less than 40% by weight, particularly preferably 7% by weight to less than 30% by weight.

The proportion of the metal capable of forming an alloy with the active substance in the mixed material may be preferably 3% by weight to less than 60% by weight, more preferably 5% by weight to less than 40% by weight, particularly preferably 7% by weight to less than 30% by weight.

The proportion of the metal M relative to the carbonaceous material may be preferably 3 to 50% by weight, more preferably 5 to 45% by weight, particularly preferably 7 to 35% by weight.

As the method for obtaining the carrier, there may be employed:

(1) the method in which both of the carbonaceous material and the alloy of the active substance are directly mixed;

(2) the method in which Li and the metal M are formed into an alloy in the course of mixing the carbonaceous material and the metal M as described above and Li;

(3) the method in which 2 or 3 of the carbonaceous material powder and the powder of the metal capable of forming an alloy with the active substance and/or the powder of the alloy of the active substance are mechanically mixed uniformly and molded;

(4) the method in which the powder of the metal capable of forming an alloy with the active substance and the powder of the active substance are mixed, and then the mixed powder as the nucleus is covered on its surface with the carbonaceous material and molded;

(5) the method in which the fused alloy of the active substance and the powder of the carbonaceous material a uniformly mixed, then solidified by cooling, and the resultant mixture formed into powder and the powder of the metal capable of forming an alloy with the active substance are mechanically mixed and molded;

(6) the method in which the fused metal capable of forming an alloy with the active substance and the powder of the carbonaceous material are uniformly mixed, then solidified by cooling, and the resultant mixture formed into powder and the powder of the alloy of the active substance are mechanically mixed and molded;

(7) the method in which the metal capable of forming an alloy with said active substance and an alloy of said active substance are coated on the surface of the carbonaceous material;

(8) the method in which an organometallic compound containing a metal capable of forming an alloy with said active substance is pyrolyzed simultaneously with pyrolysis, carbonization of the organic compound; and (9) the method in which the organometallic compound as described is pyrolyzed under the state where said organometallic compound is in contact with the carbonaceous material; etc.

As the direct mixing method of the above (1), there may be included, for example, the method in which the powder of the carbonaceous material and the powder of the alloy of the active substance are mechanically mixed and pressure molded; the method in which the surface of the alloy powder as the nucleus is covered with the carbonaceous powder as described above; the method in which the carbonaceous powder is added and mixed into the molten alloy and then solidified by cooling; etc.

The metal which is capable of being alloyed with the active substance and/or an alloy of said active substance is/are powder having a volume average particle size of 30 $\mu$m or less.

As the above method (2), there may be included, for example, the method in which the metal M, Li and the powder of the carbonaceous material are mixed, then the temperature is elevated to melt the metal M and Li, thereby forming an alloy under the state uniformly mixed.

In the case of the negative electrode obtained according to such methods, particularly the negative electrode obtained by the method (2) as described above, the active substance is carried on the carbonaceous material itself during the steps.

When a battery includes a negative electrode as described above, the active substance diffuses into the carbonaceous material in the negative electrode, and the active substance is therein carried in a predetermined amount. The carbonaceous material in the negative electrode can contain 10 to 90% by weight of the active substance.

In the above method (7), the thickness of the coating layer on the carbonaceous material surface may be preferably 50 $\mu$m or less on an average, more preferably 0.1 to 30 $\mu$m, further preferably 0.2 to 20 $\mu$m, particularly preferably 0.5 to 10 $\mu$m, most preferably 1 to 5 $\mu$m.

As the method for obtaining such coating layer, there may be employed the physical vapor deposition method (PVD), the sputtering method, the chemical vapor deposition method (CVD), the flame spraying method, the plasma flame spraying method, etc.

The carbonaceous material to be used in the carrier of the negative electrode according to the present invention has the coating layer as described above provided thereon, but the whole surface of the carbonaceous material is not required to be coated uniformly, but a part of the surface of the carbonaceous material, for example, 10% to 90% of the whole surface of the carbonaceous material, more preferably 20 to 80%, further preferably 30 to 70%, particularly preferably 40 to 60% is desirably coated.

In the above method (8), in the mixture material constituting the carrier of the negative electrode, as the mixed form of the carbonaceous material and the metal capable of forming an alloy with the active substance, it is possible to take the form according to the producing method, in which the carbonaceous material is attached on the surfaces of the metal fine particles are dispersed internally of the carbonaceous particle, or the method in which the carbonaceous material particles and the metal particles exist independently, etc.

For obtaining the mixture material constituting the carrier according to the above method (8), the two kinds of methods as described below may be included.

As the first method, the organic compounds which are the starting sources are pyrolyzed in the state of a vapor phase or a fog, carbonized to give the carbonaceous material as described above, and at this time the organometallic compound having a metal capable of forming an alloy with the active substance which is in the state of a vapor phase or fog is pyrolyzed at the same time within the same space.

In this case, pyrolysis and carbonization can be carried out under an inert gas stream of $N_2$, an argon, etc. Pyrolysis and carbonization may be also practiced under reduced pressure, or further when the organic group in the organometallic compound has a group containing oxygen such as an alkoxy group, in the sense to prevent oxidation of the metal formed, pyrolysis and carbonization can be also practiced under a reducing gas atmosphere such as hydrogen, etc.

Pyrolysis and carbonization may be practiced generally at a temperature of 200° to 1000° C., preferably 200° to (the melting point of the metal formed).

Also, after the above pyrolysis and carbonization are practiced, carbonization can be further progressed by heating at a temperature of 1000° C. to (the melting point of the metal formed), preferably 1000° C. to (the melting point of the metal formed minus 300° C.), further preferably at 1000° C. to (the melting point of the metal formed minus 500° C.) so as to give the carbonaceous material as described above.

The first method can be practiced specifically by, for example, introducing the above organic compound and the organometallic compound in gas phase together with an inert gas stream, heating the mixture to effect pyrolysis and carbonization, thereby forming a mixture of a carbonaceous material and metal particles.

Next, examples of the organic compound to be used in the second method may include cellulose resins, acrylic resins such as polyacrylonitrile, a poly($\gamma$-halogenated acrylonitrile), etc.; a halogenated vinyl resin such as a polyvinyl chloride, a polyvinylidene chloride, a polychlorinated vinyl chloride, etc.; a polyamideimide resin; a polyamide resin; any desired organic polymeric compound such as a conjugated resin of a polyacetylene, a poly(p-phenylene), etc.

The second method can be practiced by, for example, heating the organic compound previously mixed or impregnated with the organometallic compound under an inert gas stream or under reduced pressure to effect pyrolysis and carbonization, thereby forming a mixture of a carbonaceous material and metal particles. The organometallic compound may be also used as a solution dissolved in a suitable solvent.

Pyrolysis and carbonization are carried out under an inert gas atmosphere generally at 200° to 1000° C. Further thereafter, carbonization can be progressed by heating to a temperature of 1000° C. to (the melting point of the metal formed), preferably 1500° C. to (the melting point of the metal formed minus 300° C.), further preferably 1600° C. to the (the melting point of the metal formed minus 500° C.) under an inert gas atmosphere at normal pressurization of 1 to 10 kg/cm² to effect control so as to give the carbonaceous material as described below.

Thus, the mixture material of the carbonaceous material and the metal capable of forming an alloy with the active substance which is the material of the carrier is obtained.

In the above method (9), to pyrolyze said organometallic compound under the state where the organometallic compound is in contact with the carbonaceous material is to carry out pyrolysis so that at least a part of said organometallic compound may be in contact with the carbonaceous material as described above and, for example, there may be employed the method in which the organometallic compound is impregnated in the carbonaceous material and decomposed by heating, or the method in which the organometallic compound is dissolved in an organic solvent which is stable and inert to its decomposition temperature, and the carbonaceous material immersed in this solution and pyrolyzed therein. At this time, the organometallic compound may be used generally at a weight ratio of 0.03 to 10 per 1 of the carbonaceous material.

The heating temperature in pyrolysis is a temperature not higher than the melting point of the metal contained in the organometallic compound, preferably a temperature lower by 100° C. or more than the melting point of said metal, further preferably a temperature lower by 200° C. or more than the melting point of said metal. More specifically, when an organoaluminum compound is used, there may be selected a pyrolysis temperature preferably of 150° C. to 500° C., further preferably 200° C. to 400° C., particularly preferably 250° C. to 380° C.

The heating time depends on the organometallic compound employed, but when an organoaluminum compound is employed, it may be 30 seconds to 10 hours, more preferably one minute to 3 hours, further preferably 3 minutes to one hour, particularly preferably 5 minutes to 30 minutes.

For the atmosphere during heating, an inert gas atmosphere of $N_2$, Ar, etc. is generally employed.

Next, as the form which the composite material obtained by pyrolysis can take, for example, there may be included the composite form in which the surface of the carbonaceous material is coated with the metal, the composite form in which the metal is precipitated in particles on the surface of the carbonaceous material, or the composite form in which both exist as a mixture. These composite forms can be controlled by selecting the preparation conditions such as the ratio of said carbonaceous material to said organometallic compound, the concentration of the organometallic compound, the decomposition temperature of the organometallic compound, etc.

The carrier of the negative electrode according to the present invention may also contain electroconductive agents, binders, etc., in addition to the carbonaceous material coated on the surface with the metal capable of forming an alloy with the active substance and/or the alloy of the active substance as described above.

As the electroconductive agent, swelled graphite, metal powder, etc. can be added in an amount generally less than 50% by weight, preferably less than 30% by weight.

As the binder, powder of a polyolefin resin, etc. can be added in an amount less than 50% by weight, preferably 30 by weight, particularly preferably 5% by weight to less than 10% by weight.

The carrier can be prepared according to the method in which the coated carbonaceous material as described above as such or with addition of a binder, etc. is molded by compression molding, or the method in which the coated carbonaceous material as described above is mixed with a binder, etc. dissolved or suspended in a solvent, and the mixture is molded by coating onto a wire net of a current collector, etc.

Thus, in the carrier according to the present invention, except for the case in which only the metal capable of forming an alloy with the active substance is used, the active substance is previously carried, and further the active substance can be carried in a desired amount.

As the carrying method in this case, there may be employed the chemical method, the electrochemical method, the physical method, etc. For example, it is possible to apply the method in which the negative electrode which is a molded product of powder as described above is immersed in an electrolyte containing Li ions or alkali metal ions at a predetermined concentration and lithium is used as the counter-electrode to effect electrolytic impregnation with the negative electrode as the anode.

By doing so, Li ions or alkali metal ions are doped into the carbonaceous material of the carrier, and further contained in at least a part of the metal capable of forming an alloy with the active substance and/or the alloy of the active substance to be carried there. Such carrying of the active substance is not limited to the carrier of the negative electrode, but may be also effected to the carrier of the positive electrode or to the both electrodes.

The mount of the active substance carried onto the carrier of the negative electrode according to the present invention may be preferably:

(1) 1 to 20% by weight, further preferably 3 to 10% by weight, based on the above coated carbonaceous material; and (2) 1 to 80 mole %, further preferably 5 to 60 mole %, particularly preferably 10 to 50 mole %, most preferably 20 to 50 mole %, based on the metal capable of forming an alloy with the active substance.

In the amount of the active substance carried in the negative electrode is smaller than the ranges restricted in the above (1) and (2), the amount of the active substance becomes so small that the capacity of the battery becomes smaller, while if it is larger than the above range, the volume change of the negative electrode accompanied with charging and discharging becomes larger to cause contact defect with a current collector to occur, and also to form readily lithium dendrite, whereby the charging and discharging cycle life will be markedly lowered.

Referring now to FIG. 1, the constitution of the second battery of the present invention is to be described. In FIG. 1, within the positive electrode can (1) which also functions as the positive electrode terminal, a positive electrode (2) is housed as attached on the bottom of the positive can (1). The positive electrode is not particularly limited, but may preferably comprise, for example, a metal chalcogen compound which releases or captures alkali metal cations such as Li ions, etc. with charging and discharging reactions. As such metal chalcogen compound, there may be mentioned oxides of vanadium, sulfides of vanadium, oxides of molybdenum, sulfides of molybdenum, oxides of manganese, oxides of chromium oxides of titanium, sulfides of titanium and complex oxides, complex sulfides of these, etc. Preferably, $Cr_3O_8$, $V_2O_5$, $V_6O_{13}$, $VO_2$, $Cr_2O_5$, $MnO_2$, $TiO_2$, $MoV_2O_8$, $TiS_2$, $V_2S_5$, $MoS_2$, $MoS_3$, $VS_2$, $Cr_{0.25}V_{0.75}S_2$, $Cr_{0.5}V_{0.5}S_2$, etc. may be employed. Also, oxides such as $LiCoO_2$, $WO_3$, etc.; sulfides such as CuS, $Fe_{0.25}V_{0.75}S_2$, $Na_{0.1}CrS_2$, etc.; phosphine.sulfur compounds such as $NiPS_3$, $FePS_3$, etc.; and selenium compounds such as $VSe_2$, $NbSe_3$, etc. can also be used.

The positive electrode may be also a molded product of powder of an amorphous material or a composite compound of lithium and the above compounds. The amorphous material comprises $V_2O_5$ and $P_2O_5$. The amorphous material in the present invention refers to one under the state where no diffraction peak based on crystals of $V_2O_5$ is observed when this s identified by the X-ray diffraction method.

Such amorphous material can be prepared by applying conventional melting quenching method.

The positive electrode according to the present invention is prepared as described below. First, the above metal chalcogen compound such as manganese dioxide, etc. is pulverized into powder of predetermined particle sizes. Generally, those with an average particle size of 3 to 100 μm are preferred. Subsequently, to the powder is added a desired amount of binder as such or dissolved or dispersed in a suitable solvent, and the both are thoroughly kneaded and dried. As the binder, polytetrafluoroethylene, olefinic resins such as polyethylene, polypropylene, etc. or polystyrene may be employed. If the amount of the binder added is too much, the electrical resistance of the positive electrode obtained becomes inconveniently too high, while if it is too small, no binding effect will be exhibited. Therefore, it is generally preferred to be within the range of 1 to 15% by weight based on the powder weight of the metal chalcogen compound.

The kneaded product obtained is molded into pellets or a sheet with a desired thickness and provided by attachment onto a metal wire net or punched metal, etc. of stainless steel, nickel, etc. to form a relatively porous positive electrode.

Such positive electrode (2) and the negative electrode (4) are opposed to each other through a separator (3) interposed therebetween.

The separator (3) for holding the electrolyte comprises a nonwoven fabric of a material excellent in liquid storability such as polyolefinic resins. The separator (3) is impregnated with a non-aqueous electrolyte at a desired concentration having an electrolyte such as $LiClO_4$, $LiBF_4$, $LiAsF_5$, $LiPF_6$, etc. dissolved in an aprotic organic solvent such as propylene carbonate, 1,3-dioxorane, 1,2-dimethoxyethane, etc.

Also, it is possible to interpose a solid electrolyte such as polyethylene oxide, polyphosphazene, β-alumina, etc., which is a conductor for Li or alkali metal ions between the positive electrode and the negative electrode.

The negative electrode (4) has an active substance carried on a carrier comprising a material obtained by coating the surface of the carbonaceous material having the characteristics as described above with a metal capable of forming an alloy with the active substance and/or an alloy of the active substance, and provided by attachment within the negative can (5) which also functions as the negative electrode terminal.

These positive electrode (2), separator (3) and the negative electrode (4) as a whole constitute the generating elements. These generating elements are built in within a battery vessel comprising the positive electrode can (1) and the negative electrode can (5) to assemble the battery.

(6) is an insulating packing for separating the positive electrode and the negative electrode, and the battery is sealed with the opening of the positive electrode can (1) being bent toward the inner direction.

In the secondary battery of the present invention, release of carried Li ions (or alkali metal ions composed mainly of Li) occur during discharging at the negative electrode, and during charging, Li ions are carried on the carrier of the negative electrode by doping of Li ions into the carbonaceous material in the carrier and accumulation of Li ions into the alloy of the coating layer.

By such carrying and releasing of Li ions, the charging and discharging cycle of the battery is repeated.

The secondary battery of the present invention, by use of a carrier comprising a material obtained by coating the surface of the carbonaceous material as described above with a metal capable of forming an alloy with the active substance and/or an alloy of the active substance for the negative electrode, could have a large amount of the active substance carried on the negative electrode, also enabled repetition of carrying and releasing of the active substance smoothly during charging and discharging, and further could lower the internal resistance of the battery, whereby excellent charging characteristics with larger capacity not found in the prior art can be exhibited, and also high output can be exhibited.

In the present invention, each measurements of the elemental analysis, X-ray wide angle diffraction and electron spin resonance spectrum are carried out following the methods a described below.

[Elemental analysis]

A sample is dried in vacuum at 120° C. for about 15 hours. Then, the sample is transferred onto a hot plate in a dry box and dried in vacuum at 100° C. for 1 hour. A portion of the dried sample is put into an aluminum cup in an argon atmosphere, and the carbon content is determined from the weight of $CO_2$ gas evolved as a result of combustion whereas the hydrogen content is determined from the weight of $H_2O$ also evolved by combustion. In the Examples of the present invention that follow, an elemental analyzer of Perkin-Elmer Model 240 C was used.

[X-ray wide angle diffraction]

(1) $d_{002}$, the spacing of (002) planes, and $d_{110}$, the spacing of (110) planes:

A powder of carbonaceous material (flaky carbonaceous material is reduced to a powder in an agate mortar) is packed into a sample cell together with about 15 wt % of the powder of an internal standard substance, a high-purity silicon powder of the standard grade for X-ray analysis. A wide-angle X-ray reflection diffractometer scan is obtained with monochromatic CuK$\alpha$ radiation from a graphite monochrometer. Instead of making corrections associated with the Lorentz factor, polarization factor, absorption factor and atomic scattering factor, the following simple and convenient method is used. Draw a baseline for the scan curves corresponding to diffractions at (002) and (110) Planes. Plot the substantial intensities as calculated from the baseline, obtaining corrected curves for (002) and (110) planes. Draw an angular axis at a height which is two-thirds of the height of the peak in each curve and obtain the midpoint of the line defined by the two points where a line parallel to that angular axis intersects the scan curve. Correct the angle of the midpoint by the internal standard to obtain a value twice the angle of diffraction. Substitute this value and the wavelength of CuK$\alpha$ radiation, $\lambda$, into the following two equations of Bragg's law to obtain $d_{002}$ and $d_{110}$:

$$d_{002} = \frac{\lambda}{2\sin\theta} \text{ [Å]};$$

$$d_{110} = \frac{\lambda}{2\sin\theta'} \text{ [Å]}$$

wherein
$\lambda$: 1.5418 Å
$\theta, \theta'$: the angle of diffraction corresponding to $d_{002}$ or $d_{110}$.

(2) Crystallite size in c and a axes, Lc and La:

Obtain the half-width $\beta$ at a point half the height of the peak in each of the corrected scan curves prepared in (1), and substitute this value into the following equations:

$$Lc = \frac{K \cdot \lambda}{\beta \cdot \cos\theta} \text{ [Å]};$$

$$La = \frac{K \cdot \lambda}{\beta \cdot \cos\theta'} \text{ [Å]}$$

Various values may be taken for the shape factor K, but in the present invention, K=0.90 is used. For the meanings of $\lambda$, $\theta$ and $\theta'$, the same as the previous paragraph.

[Line width between peaks in the first differential of the absorption spectrum of electron spin resonance: $\Delta Hpp$]

The first differential of the absorption spectrum of electron spin resonance was measured with JEOL JES-FE 1X ESR spectrometer in the X-band. A powder of carbonaceous material (flaky carbonaceous material is reduced to a powder in an agate mortar) is put into a capillary tube (ID: 1 mm) which is placed in an ESR tube (OD: 5 mm). The radiofrequency magnetic field is modulated by an amount of 6.3 gauss. All the procedures above are followed within air at 23° C. The value of the line width between peaks ($\Delta Hpp$) is determined by comparison to a standard sample $Mn^{2+}/MgO$.

EXAMPLES

The present invention is described by referring to Examples.

EXAMPLE 1

(1) Preparation of Positive Electrode 5 g of $MnO_2$ powder calcinated at 470° C. and 0.5 g of powdery polytetrafluoroethylene were kneaded, and the kneaded product obtained was subjected to roll molding to obtain a sheet with a thickness of 0.4 mm.

One sheet of this sheet was pressure adhered onto a stainless steel net of 0.1 mm in wire diameter and 60 mesh which is a current collector to provide a positive electrode.

(2) Preparation of Negative Electrode 108 g of o-cresol, 32 g of p-formaldehyde and 240 g of ethyl cellosolve were charged together with 10 g of sulfuric acid into a reactor, and the reaction was carried out under stirring at 115° C. for 4 hours. After completion of the reaction, the reaction mixture was neutralized by addition of 17 g of $NaHCO_3$ and 30 g of water. Subsequently, the reaction mixture was thrown into 2 liters of water under high speed stirring, and the product precipitated was filtered and dried to obtain 115 g of linear high molecular weight novolac resin. 225 g of the above novolac resin and 25 g of hexamine were placed into a vessel made of agate of 500 ml, in which 5 balls made of agate of 30 mm in diameter and 10 balls made of agate of 20 mm in diameter were placed, and the vessel was set in a ball mill to effect crushing and mixing for 20 minutes.

The mixed powder of the novolac resin and hexamine thus obtained was subjected to heating treatment in $N_2$ gas at 250° C. for 3 hours. Further, the heat treated product was set in an electrical heating furnace, and the heat treated product was elevated in temperature up to 950° C. at a temperature elevation speed of 200° C./hour while flowing $N_2$ gas at a rate of 200 liter/hour per 1 kg of the heat treated product, and calcinated by maintaining for additional 1.5 hours at that temperature and then left to cool.

Next, the material after calcination was set in another electrical furnace, elevated in temperature up to 2000° C. at a temperature elevation speed of 25° C./min and maintained at that temperature for additional 1.5 hours to practice carbonization.

The carbonized product thus obtained was placed in a vessel made of agate of 250 ml, in which one ball made of agate of 30 mm in diameter, 3 balls made of agate of 25 mm in diameter and 9 balls made of agate of 20 mm in diameter were placed, and the vessel was set in a ball mill to effect crushing for 10 minutes, and further crushing was continues for 25 minutes with addition of 4 balls made of agate of 20 mm in diameter.

The carbonaceous material was found to have the following characteristics as the result of analyses such as elemental analysis, X-ray wide angle diffraction, Raman spectrum, etc.

Hydrogen/carbon (atomic ratio)=0.4
$d_{002}$=3.66 Å, $L_c$=13.0 Å
$a_0(2d_{110})$=2.42 Å
$L_a$=21.0 Å, G value: 1.0

The powder of this carbonaceous material (average particle size: 15 μm) was mixed with 10% by weight of powder of Li/Al alloy (330 mesh under) containing 18.4% by weight of Li.

After the mixture was mixed with 7% by weight of polyethylene powder with an average particle size of 5 μm, the mixture was compression molded to form a carrier shaped in pellets with a thickness of 0.5 mm.

Next, the pellets were immersed in an electrolyte with a Li ion concentration of 1 mole/liter, and subjected to the electrolysis treatment with the use of the pellets as the anode and metallic Li as the cathode. The electrolysis treatment conditions were a bath temperature of 20° C., a current density of 0.5 mA/cm² and 10 hours.

According to this treatment, combined with Li contained previously in the Li/Al alloy, 10 mAh of Li was carried on the carrier (pellet).

(3) Assembly of Battery

In a positive electrode can made of stainless steel, the above positive electrode was provided by attachment with the current collector being downward, and after a polypropylene nonwoven fabric was mounted as the separator, a non-aqueous electrolyte having $LiClO_4$ dissolved at a concentration of 1 mole/liter in propylene carbonate was impregnated therein. Subsequently, the above negative electrode was mounted thereon to constitute a generator element.

Prior to assembling in the battery, the positive electrode was subjected to the electrolysis treatment to make the positive electrode the anode and lithium the cathode by dipping in a Li ion electrolyte with a concentration of 1 mole/liter. The electrolysis treatment was conducted under the conditions of a bath temperature of 20° C., a current density of 0.5 mA/cm² and an electrolysis time of 25 hours to have Li with a capacity of 16.0 mAh carried on the positive electrode.

Thus, the button-shaped secondary battery as shown in FIG. 1 was prepared.

(4) Characteristics of Battery

Figure 2:
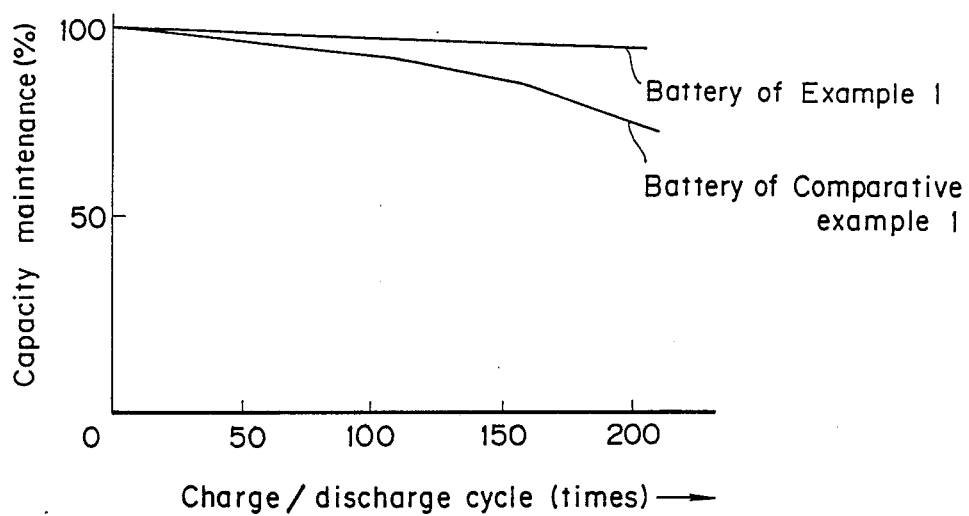
FIGS. 2, 4, 5, 8 and 10 are graphs showing the relationship between the charge/discharge cycle versus capacity maintenance in Examples of the present invention and Comparative examples.

For the battery thus prepared, after discharging-charging-discharging and several times of charging and discharging were preliminarily practiced, constant voltage charging-20KΩ constant resistance discharging were repeated between 3.5 and 2 V, and the capacity maintenance of the battery in each cycle was measured for cycle evaluation. The results are shown in FIG. 2.

Figure 3:
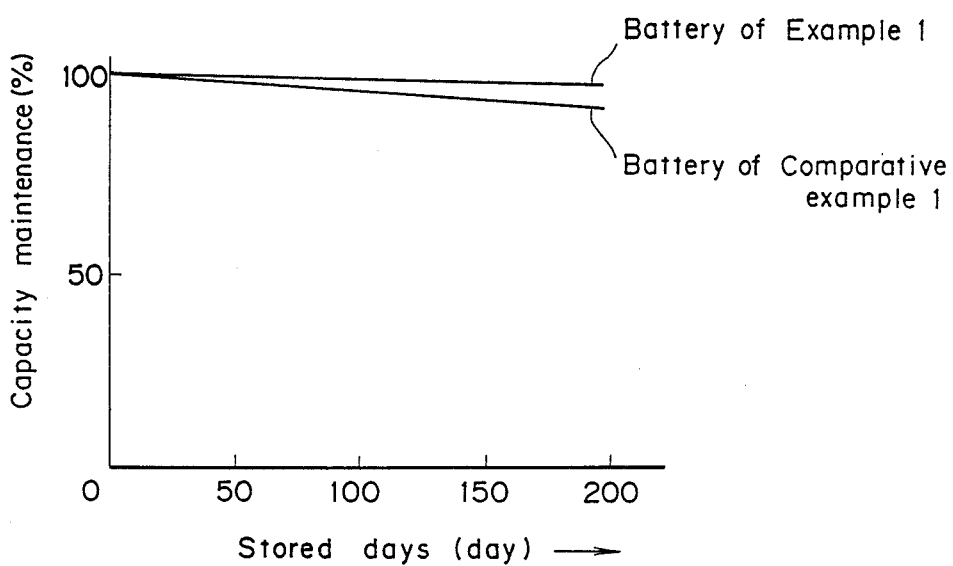

Further, self discharging evaluation test during storage at 20° C. was conducted, and the capacity maintenance relative to the capacity before storage was measured to obtain the results shown in FIG. 3.

COMPARATIVE EXAMPLE 1

(1) Preparation of Positive Electrode

A positive electrode was prepared in the same manner as in Example 1.

(2) Preparation of Negative Electrode

By using only the carbonaceous material prepared similarly as in Example 1, a carrier (pellet) was prepared without addition of Li/Al alloy powder and the electrolysis treatment was conducted under the same conditions as in Example 1 to have Li carried thereon to prepare a negative electrode.

(3) Assembly of Battery

A battery was assembled in the same manner as in Example 1.

(4) Characteristics of Battery

The battery characteristics were measured under the same conditions as in Example 1 to obtain the results shown in FIG. 2 and FIG. 3.

EXAMPLE 2

(1) Preparation of Positive Electrode

A positive electrode was prepared in the same manner as in Example 1.

(2) Preparation of Negative Electrode

Powder of carbonaceous material was obtained in the same manner as in Example 1.

The carbonaceous material powder (average particle size: 15 μm) was mixed with 10% by weight of Al powder (average particle size: 5 μm). After the mixture was mixed with 5% by weight of polyethylene powder with an average particle size of 5 μm, the resultant mixture was compression molded into a carrier shaped in pellet with a thickness of 0.5 mm.

(3) Assembly of Battery

A battery was assembled in the same manner as in Example 1.

(4) Characteristics of Battery

For the battery thus prepared, charging was effected at a constant current of 250 μA until the battery voltage became 3.3 V, and then preliminary charging and discharging were practiced for 5 cycles at a constant current of 250 μA with potential regulations of the upper limit of 3.3 V and the lower limit of 1.8 V. The discharging capacity at the 5th cycle was 12 mAh when the final voltage was made 2.0 V. This capacity was made the initial capacity.

Figure 4:
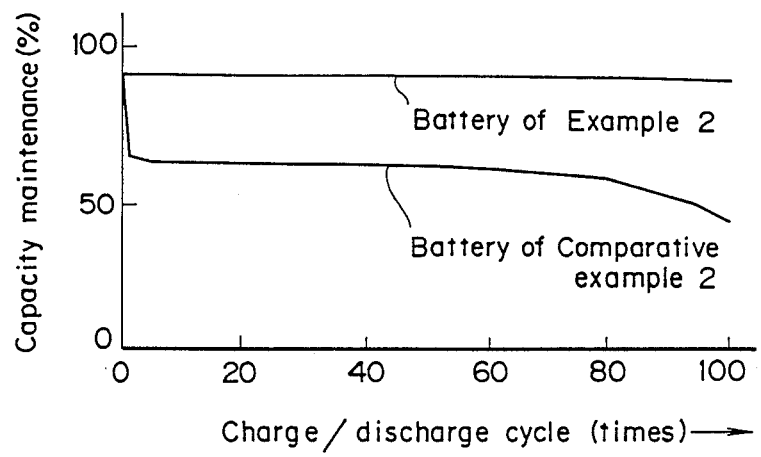

Then, for carrying out charging and discharging cycle evaluation during large current, charging and discharging were repeated at a constant current of 1 mA with potential regulations of the upper limit of 3.3 V and the lower limit of 1.8 V, and the maintenance of the discharging capacity relative to the initial capacity when the final voltage in each cycle was made 2.0 V was measured for cycle evaluation. The results are shown in FIG. 4.

Figure 5:
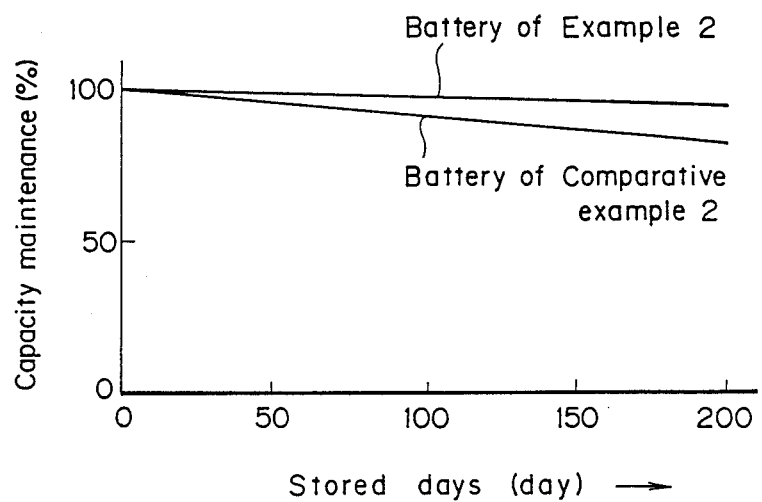

Further, self-discharging evaluation test during storage at 20° C. was conducted, and the capacity maintenance relative tot he capacity before storage was measured to obtain the results shown in FIG. 5.

COMPARATIVE EXAMPLE 2

(1) Preparation of Positive Electrode

A positive electrode was prepared in the same manner as in Example 1.

(2) Preparation of Negative Electrode

By use only of the carbonaceous material prepared similarly as in Example 2, a negative electrode was prepared in the same manner as in Example 2 except that no Al powder was added.

(3) Assembly of Battery

A battery was assembled in the same manner as in Example 1.

(4) Characteristics of Battery

The battery characteristics were measured under the same conditions in the same manner as in Example 2 to obtain the results shown in FIG. 4 and FIG. 5. The initial capacity thereof was 8 mAh.

EXAMPLE 3

(1) Preparation of Positive Electrode

A positive electrode was prepared in the same manner as in Example 1.

(2) Preparation of Negative Electrode

Powder of carbonaceous material was obtained in the same manner as in Example 1.

The powder of this carbonaceous material (average particle size: 15 μm) was mixed with 7.5% by weight of powder of Li/Al alloy (330 mesh under) containing 18.4% by weight of Li and 7.5% by weight of Al metal powder (200 mesh under).

After the mixture was mixed with 7% by weight of polyethylene powder with an average particle size of 5 μm, the mixture was compression molded to form a carrier shaped in pellets with a thickness of 0.5 mm.

Next, the pellets were immersed in an electrolyte with a Li ion concentration of 1 mole/liter, and subjected to the electrolysis treatment with the use of the pellets as the anode and metallic Li as the cathode. The electrolysis treatment conditions were a bath temperature of 20° C., a current density of 0.5 mA/cm$^2$ and 13.5 hours.

According to this treatment, combined with Li contained previously in the Li/Al alloy, 15 mAh of Li was carried on the carrier (pellet).

(3) Assembly of Battery

A battery was assembled in the same manner as in Example 1 except that the electrolysis treatment was carried out under the conditions of a bath temperature of 20° C., a current density of 0.5 mA/cm$^2$ and an electrolysis time of 7 hours to have Li with a capacity of 2.0 mAh carried on the positive electrode.

(4) Characteristics of Battery

Figure 6:
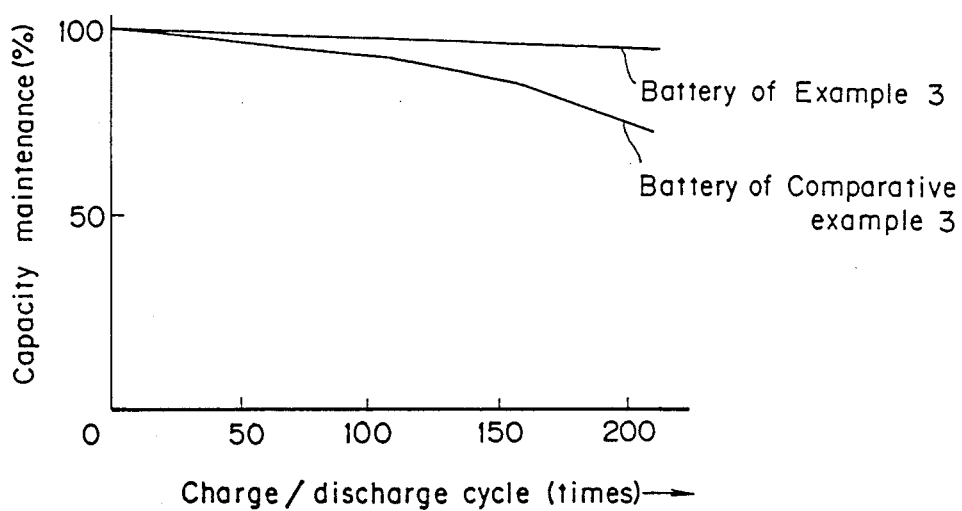
Figure 7:
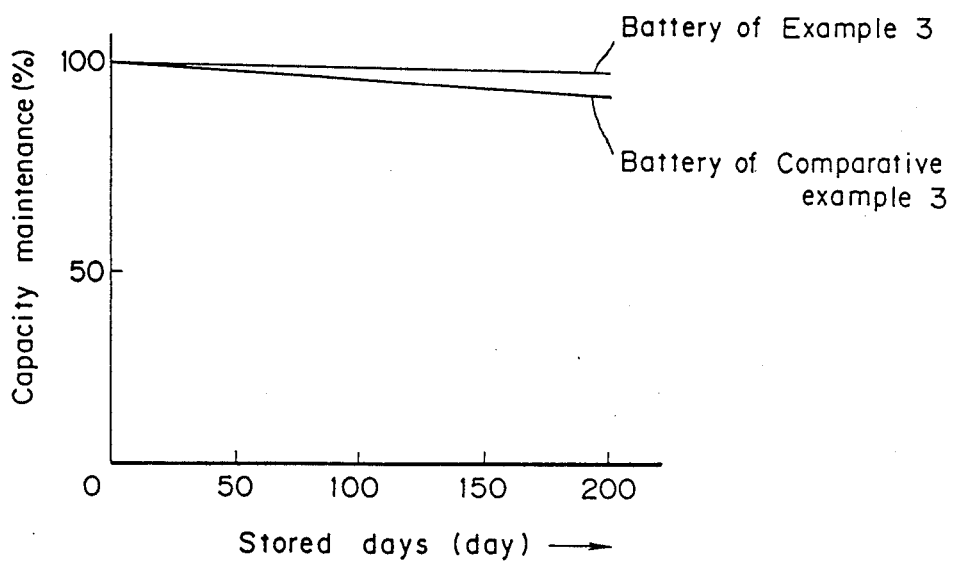

The battery characteristics were measured under the same conditions in the same manner as in Example 1 to obtain the results shown in FIG. 6 and FIG. 7.

COMPARATIVE EXAMPLE 3

(1) Preparation of Positive Electrode

A positive electrode was prepared in the same manner as in Example 1.

(2) Preparation of Negative Electrode

By using only the carbonaceous material prepared similarly as in Example 3, a carrier (pellet) was prepared without addition of Li/Al alloy powder and Al powder and the electrolysis treatment was conducted under the same conditions as in Example 3 to have Li carried thereon to prepare a negative electrode.

(3) Assembly of Battery

A battery was assembled in the same manner as in Example 1.

(4) Characteristics of Battery

The battery characteristics were measured under the same conditions in the same manner as in Example 3 to obtain the results shown in FIG. 6 and FIG. 7.

EXAMPLE 4

(1) Preparation of Positive Electrode

A positive electrode was prepared in the same manner as in Example 1.

The positive electrode obtained was immersed in Li ion electrolyte at a concentration of 1 mole/liter and subjected to the electrolysis treatment with this positive electrode as the anode and metallic lithium as the cathode. The electrolysis treatment was conducted under the conditions of a bath temperature of 20° C. and a current density of 0.5 mA/cm$^2$ to have 4 mAh of Li carried on the positive electrode.

(2) Preparation of Negative Electrode

Cellulose powder was set in an electric heating furnace, elevated in temperature at a temperature elevation speed of 200° C./hour up to 950° C. while flowing N$_2$ gas at a rate of 200 liter/hour per 1 kg of the heat treated product, maintained at that temperature for additional one hour to effect calcination, followed by leaving to cool.

Next, the material after calcination was set in another electrical furnace, elevated in temperature up to 1800° C. at a temperature elevation speed of 25° C./min and further maintained at that temperature for one hour to practice carbonization.

The carbonaceous material thus obtained, as the result of elemental analysis, X-ray wide angle diffraction, Raman spectrum analysis, had the characteristics as shown below, and also a particle size distribution and a specific surface area determined by the BET method as shown below:

Hydrogen/carbon (atomic ratio)=0.05
$d_{002}$=3.57 Å, $L_c$=21 Å
$a_0(2d_{110})$=2.41 Å, $L_a$=23 Å
G value: 0.7
Volume average particle size=10.7 μm
BET specific surface area=28 m$^2$/g Subsequently, the carbonaceous material powder [Group (a)] was mixed with 10% by weight of powder of aluminum powder with a volume average particle size of 5 μm [Group (b)]. Further, after 5% by weight of polyethylene powder with a volume average particle size of 5 μm was mixed, the resultant mixture was compression molded into a carrier shaped in pellet with a thickness of 0.5 mm.

The carrier obtained was immersed in Li ion electrolyte at a concentration of 1 mole/liter, and subjected to the electrolysis treatment with this carrier as the anode and metallic lithium as the cathode. The electrolysis treatment was conducted under the conditions of a bath temperature of 20° C. and a current density of 0.5 mA/cm$^2$ to have 12 mAh of Li carried on the carrier to provide a negative electrode.

(3) Assembly of Battery

A battery was assembled in the same manner as in Example 1.

(4) Characteristics of Battery

For the battery thus prepared, charging and discharging were repeated at a constant current of 500 μA with potential regulations of the battery voltage of the upper limit of 3.3 V and the lower limit of 1.8 V to perform charging and discharging cycle evaluation for examination of the performance of the battery at 5th cycle and 100th cycle to obtain the results shown in Table 1.

Further, after charging at 6th cycle was completed, the battery was left to stand with the circuit being opened at 20° C. for 90 days, and thereafter discharging was practiced. The performance of the battery at the 6th cycle was compared with those of the previous 5th cycle to obtain the results shown in Table 2.

COMPARATIVE EXAMPLE 4

(1) Preparation of Positive Electrode

A positive electrode was prepared in the same manner as in Example 1, and Li was carried thereon.

(2) Preparation of Negative Electrode

By use only of the carbonaceous material [Group (a)] prepared in the same manner as in Example 4, a carrier was prepared in the same manner as in Example 1 except for adding no Al powder [Group (b)], and Li was carried thereon to provide a negative electrode.

(3) Assembly of Battery

A battery was assembled in the same manner as in Example 1.

(4) Characteristics of Battery

The battery characteristics were measured under the same conditions similarly as in Example 4 to obtain the results shown in Table 1 and Table 2.

EXAMPLE 5

(1) Preparation of Positive Electrode

A positive electrode was prepared in the same manner as in Example 4, and Li was carried thereon.

(2) Preparation of Negative Electrode

The carbonaceous material powder prepared in the same manner as in Example 4 [Group (a)] was mixed with 15% by weight of Li/Al alloy powder (volume average particle size: 3 μm) with Li content of 18.4% by weight, further mixed with 7% by weight of polyethylene powder with a volume average particle size of 2 μm and then compression molded into a negative electrode shaped in pellet with a thickness of 0.5 mm.

(3) Assembly of Battery

In the same manner as in Example 1, a button type secondary battery shown in FIG. 1 was prepared.

(4) Characteristics of Battery

The battery characteristics were measured under the same conditions similarly as in Example 4 to obtain the results shown in Table 1 and Table 2.

EXAMPLE 6

(1) Preparation of Positive Electrode

A positive electrode was prepared in the same manner as in Example 4. On the positive electrode was carried 10 mAh of Li according to the same electrolysis treatment as in Example 4.

(2) Preparation of Negative Electrode

Phenol resin powder was set in an electric heating furnace, elevated in temperature at a temperature elevation speed of 200° C./hour up to 1000° C. while flowing N$^2$ gas at a rate of 200 liter/hour per 1 kg of the heat treated product, maintained at that temperature for additional one hour to effect calcination, followed by leaving to cool.

Next, the material after calcination was set in another electrical furnace, elevated in temperature up to 2100° C. at a temperature elevation speed of 25° C./min and further maintained at that temperature for one hour to practice carbonization.

The carbonaceous material thus obtained, as the result of elemental analysis, X-ray wide angle diffraction, Raman spectrum analysis, had the characteristics as shown below, and also a particle size distribution and a specific surface area determined by the BET method as shown below:

Hydrogen/carbon (atomic ratio)=0.04
$d_{002}$=3.59 Å, $L_c$=15 Å
$a_0(2d_{110})$=2.42 Å, $L_a$=22.7 Å
G value: 0.8
Volume average particle size=15.2 μm
BET specific surface area=18 m$^2$/g Subsequently, the carbonaceous material powder [Group (a)] was mixed with 7.5% by weight of powder of aluminum powder with a volume average particle size of 5 μm [Group (b)] and 7.5% by weight of Li/Al alloy powder (Li content: 18.5% by weight, volume average particle size: 5 μm) [Group (b)]. Further, after 5% by weight of polyethylene powder with a volume average particle size of 5 μm was mixed, the resultant mixture was compression molded into a carrier shaped in pellet with a thickness of 0.5 mm.

(3) Assembly of Battery

A button type secondary battery as shown in FIG. 1 was assembled in the same manner as in Example 4.

(4) Characteristics of Battery

The battery characteristics were measured under the same conditions similarly as in Example 4 to obtain the results shown in Table 1 and Table 2.

COMPARATIVE EXAMPLE 5

(1) Preparation of Positive Electrode

A positive electrode was prepared in the same manner as in Example 6. On the positive electrode was carried 16 mAh of Li according to the same electrolysis treatment as in Example 4.

(2) Preparation of Negative Electrode

By use only of the carbonaceous material [Group (a)] prepared in the same manner as in Example 6, a carrier was prepared in the same manner as in Example 6 except for adding no Al powder and Li/Al alloy powder [Group (b)].

(3) Assembly of Battery

A battery was assembled in the same manner as in Example 6.

(4) Characteristics of Battery

The battery characteristics were measured under the same conditions similarly as in Example 6 to obtain the results shown in Table 1 and Table 2.

TABLE 1

|  | 5 cycle | | | 100 cycle | | | Discharged amount in 100 cycle |
|---|---|---|---|---|---|---|---|
|  | Charged amount (mAh) | Discharged amount (mAh) | Coulomb efficiency (%) | Charged amount (mAh) | Discharged amount (mAh) | Coulomb efficiency (%) | Discharged amount in 5 cycle (%) |
| Example 4 | 13.7 | 13.5 | 98.5 | 13.7 | 13.4 | 97.8 | 99.3 |
| Comparative example 4 | 8.6 | 8.4 | 97.6 | 8.6 | 8.2 | 95.4 | 97.6 |
| Example 5 | 11.7 | 11.5 | 98.3 | 11.7 | 11.4 | 97.4 | 99.1 |
| Example 6 | 12.3 | 12.1 | 98.4 | 12.3 | 12.0 | 97.6 | 99.2 |
| Comparative example 45 | 8.5 | 8.3 | 97.6 | 8.5 | 8.1 | 95.3 | 97.6 |

TABLE 2

|  | 5 cycle | | | 6 cycle (discharged after 90 days of charging) | | | Discharged amount in 6 cycle |
|---|---|---|---|---|---|---|---|
|  | Charged amount (mAh) | Discharged amount (mAh) | Coulomb efficiency (%) | Charged amount (mAh) | Discharged amount (mAh) | Coulomb efficiency (%) | Discharged amount in 5 cycle (%) |
| Example 4 | 13.7 | 13.5 | 98.5 | 13.7 | 13.0 | 94.9 | 96.3 |
| Comparative example 4 | 8.6 | 8.4 | 97.6 | 8.6 | 7.7 | 89.5 | 91.7 |
| Example 5 | 11.7 | 11.5 | 98.3 | 11.7 | 11.1 | 94.9 | 96.5 |
| Example 6 | 12.3 | 12.1 | 98.4 | 12.3 | 11.6 | 94.3 | 95.9 |
| Comparative example 45 | 8.5 | 8.3 | 97.6 | 8.5 | 7.6 | 89.4 | 91.6 |

EXAMPLE 7

(1) Preparation of Positive Electrode

A positive electrode was prepared in the same manner as in Example 1.

(2) Preparation of Negative Electrode

Particles of a crystalline cellulose were set in an electric heating furnace, elevated in temperature under $N_2$ gas stream at a temperature elevation speed of 200° C./hour up to 1000° C., and further maintained at 1000° C. for one hour. Then, the particles were left to cool and the particles of carbonaceous material obtained were set in another electric furnace, and elevated in temperature under $N_2$ gas stream at a temperature elevation speed of 1000° C./hour up to 1800° C. and further maintained at 1800° C. for one hour.

The carbonaceous material thus obtained was placed in a vessel made of agate of 500 ml, in which 2 balls made of agate of 30 mm in diameter, 6 balls made of agate of 25 mm in diameter and 16 balls made of agate of 20 mm in diameter were placed, and crushing was conducted for 3 minutes.

The carbonaceous material, as the result of measurements of analyses such as elemental analysis, X-ray wide angle diffraction, etc., particle size distribution, specific surface area, etc., was found to have the following characteristics.

Hydrogen/carbon (atomic ratio)=0.04
$d_{002}$=3.59 Å, Lc=14 Å
$a_0(2d_{110})$=2.41 Å, La=25 Å
Volume average particle size=35.8 μm
BET specific surface area=8.2 m²/g The particles of the carbonaceous material were placed on a substrate in a vacuum vapor deposition device, and particles of Al were set as the vaporization source. The vaporization source was heated under vacuum to have Al vapor deposited from one face direction on the surface of the carbonaceous material particles as described above.

Thus, a material comprising a thin layer of Al metal with a thickness of about 5 μm coated on the surface of the carbonaceous material particles as described above was obtained.

After this was mixed with 7% by weight of polyethylene powder with an average particle size of 5 μm, the mixture was compression molded into a carrier shaped in pellet with a thickness of 0.5 mm.

Subsequently, the carrier pellet was immersed in an electrolyte of Li ion at a concentration of 1 mole/liter, and subjected to the electrolysis treatment with this pellet as the anode and metallic Li as the cathode. The electrolysis treatment conditions were a bath temperature of 20° C., a current density of 0.5 mA/m$^2$, and 15 mAh of Li was carried on the carrier to provide a negative electrode.

(3) Assembly of Battery

A battery was assembled in the same manner as in Example 1.

Also, the positive electrode was subjected to the same electrolysis treatment as the negative electrode prior to assembling into the battery to have Li with a capacity of 3.0 mAh carried thereon. The electrolysis treatment conditions were a bath temperature of 20° C., a current density of 0.5 mA/cm$^2$ and an electrolysis time of 10 hours. Thus, a button type secondary battery as shown in FIG. 1 was prepared.

(4) Characteristics of Battery

For the battery thus prepared, charging and discharging were repeated at a constant current of 300 μA within the range of the battery voltage between the upper limit of 3.2 V and the lower limit of 1.8 V for cycle evaluation. The performances at the 60th cycle and the 180th cycle are shown in Table 3.

The internal resistance of the battery was found to be 16 on assembling, and 18 after 20 cycles of charging and discharging were repeated.

COMPARATIVE EXAMPLE 6

(1) Preparation of Positive Electrode

A positive electrode was prepared in the same manner as in Example 7.

(2) Preparation of Negative Electrode

A carrier was prepared by use of the particles of the carbonaceous material prepared in the same manner as in Example 7 without applying coating of Al on its surface. The carrier was subjected to the electrolysis treatment similarly as in Example 7 to have 15 mAh of Li carried thereon to provide a negative electrode.

(3) Assembly of Battery

A battery was assembled in the same manner as in Example 7.

(4) Characteristics of Battery

The battery characteristics were measured under the same conditions similarly as in Example 7, and the results are also shown in Table 3.

The internal resistance of the battery was found to be 23Ω on assembling and 32Ω when 20 cycles of charging and discharging were repeated.

TABLE 3

|  | 60 cycle | | | 180 cycle | | |
| --- | --- | --- | --- | --- | --- | --- |
|  | Charged amount (mAh) | Discharged amount (mAh) | Coulomb efficiency (%) | Charged amount (mAh) | Discharged amount (mAh) | Coulomb efficiency (%) |
| Example 7 | 13.7 | 13.4 | 97.8 | 13.6 | 13.3 | 97.8 |
| Comparative example 6 | 9.2 | 9.0 | 97.8 | 9.1 | 8.7 | 95.6 |

EXAMPLE 8

(1) Preparation of Positive Electrode

A positive electrode was prepared in the same manner as in Example 1.

(2) Preparation of Negative Electrode

A mixture of 500 mg of powder of naphthalene-1,4,5,8-tetracarboxylic acid dianhydride and triisobutyl aluminium permeated therethrough was set in an electric heating furnace, elevated in temperature under Ar gas stream at a temperature elevation speed of 15° C./min up to 350° C., and further maintained at 350° C. for 30 minutes to practice pyrolysis-carbonization of naphthalene-1,4,5,8-tetracarboxylic acid dianhydride and decomposition of triisobutyl aluminum.

Then, the decomposed product was further elevated in temperature at a temperature elevation speed of 15° C./min up to 600° C., and maintained at 600° C. for 30 minutes to further proceed carbonization.

Thus, a mixed material comprising 90% by weight of a carbonaceous material and 10% by weight of Al metal was obtained.

The carbonaceous material in the mixed material was found to have d$_{002}$=3.66 A and Lc=13.5 A as the result of X-ray wide angle diffraction analysis.

After the mixed material was mixed with 5% by weight of polyethylene powder with an average particle size of 5 μm, the resultant mixture was compression molded into a carrier shaped in pellet with a thickness of 0.5 mm.

Subsequently, the carrier pellet was immersed in an electrolyte of Li ion at a concentration of 1 mole/liter, and subjected to the electrolysis treatment with this pellet as the anode and metallic Li as the cathode. The electrolysis treatment conditions were a bath temperature of 20° C., a current density of 0.5 mA/m$^2$, and 12 mAh of Li was carried on the carrier to provide a negative electrode.

(3) Assembly of Battery

A battery was assembled in the same manner as in Example 1.

Also, the positive electrode was subjected to the same electrolysis treatment as the negative electrode prior to assembling into the battery to have Li with a capacity of 4 mAh carried thereon. The electrolysis treatment conditions were a bath temperature of 20° C., a current density of 0.5 mA/cm². Thus, a button type secondary battery as shown in FIG. 1 was prepared.

(4) Characteristics of Battery

For the battery thus prepared, charging and discharging were repeated at a constant current of 750 μA at a battery voltage within the range between the upper limit of 3.2 V and the lower limit of 1.8 V for cycle evaluation. The performances at the 60th cycle and the 200th cycle are shown in Table 4.

COMPARATIVE EXAMPLE 7

(1) Preparation of Positive Electrode

A positive electrode was prepared in the same manner as in Example 8.

(2) Preparation of Negative Electrode

By use only of 500 mg of naphthalene-1,4,5,8-tetracarboxylic acid dianhydride, pyrolysis-carbonzation was practiced in the same manner as in Example 8 except for permitting no tributyl ammonium permeated therethrough to obtain a carbonaceous material.

The carbonaceous material was found to have $d_{002}=3.65$ Å and $L_c=13.7$ Å as the result of X-ray wide angle diffraction analysis.

This material was formed into carrier shaped in pellet similarly as Example 8, subjected to the same electrolysis treatment as in Example 8 to have 12 mAh of Li carried thereon to provide a negative electrode.

(3) Assembly of Battery

A battery was assembled in the same manner as in Example 8.

(4) Characteristics of Battery

The battery characteristics were measured under the same conditions similarly as in Example 8 to obtain the results shown in Table 4.

The carbonaceous material thus obtained was placed in a vessel made of agate of 500 ml, in which 2 balls made of agate of 30 mm in diameter, 6 balls made of agate of 25 mm in diameter and 16 balls made of agate of 20 mm in diameter were placed, and crushing was conducted for 3 minutes.

The carbonaceous material, as the result of measurements of analyses such as elemental analysis, X-ray wide angle diffraction, etc., particle size distribution, specific surface area, etc., was found to have the following characteristics.

Hydrogen/carbon (atomic ratio)=0.04
$d_{002}=3.59$ Å, $L_c=14$ Å
$a_0(2d_{110})=2.41$ Å, $L_a=25$ Å
Volume average particle size=38 μm
BET specific surface area=8.2 m²/g Subsequently, pyrolysis was carried out by contacting triisobutyl aluminum with the above carbonaceous material. More specifically, 5 g of the above carbonaceous material was added into 18.5 ml of 1 mole/liter hexane solution of triisobutyl aluminum, and after well impregnated, the mixture was elevated in temperature under N₂ stream up to 300° C. and further heated at 300° C. for 30 minutes to effect pyrolysis.

Thus, a composite material of the above carbonaceous material and aluminum containing 10% by weight of aluminum mixed therein was obtained.

After this was mixed with 7% by weight of polyethylene powder with an average particle size of 5 μm, the mixture was compression molded into a carrier shaped in pellet with a thickness of 0.5 mm.

Subsequently, the carrier pellet was immersed in an electrolyte of Li ion at a concentration of 1 mole/liter, and subjected to the electrolysis treatment with this pellet as the anode and metallic Li as the cathode. The electrolysis treatment conditions were a bath temperature of 20° C., a current density of 0.5 mA/m², and 12 mAh of Li was carried on the carrier to provide a negative electrode.

(3) Assembly of Battery

TABLE 4

|  | 60 cycle | | | 180 cycle | | |
| --- | --- | --- | --- | --- | --- | --- |
|  | Charged amount (mAh) | Discharged amount (mAh) | Coulomb efficiency (%) | Charged amount (mAh) | Discharged amount (mAh) | Coulomb efficiency (%) |
| Example 8 | 12.0 | 11.8 | 98.3 | 11.9 | 11.7 | 98.3 |
| Comparative example 7 | 7.1 | 6.7 | 94.4 | 6.0 | 5.4 | 90.0 |

EXAMPLE 9

(1) Preparation of Positive Electrode

A positive electrode was prepared in the same manner as in Example 1.

(2) Preparation of Negative Electrode

Particles of a crystalline cellulose were set in an electric heating furnace, elevated in temperature under N₂ gas stream at a temperature elevation speed of 200° C./hour up to 1000° C., and further maintained at 1000° C. for one hour. Then, the particles were left to cool and the particles of carbonaceous material obtained were set in another electric furnace, and elevated in temperature under N₂ gas stream at a temperature elevation speed of 1000° C./hour up to 1800° C. and further maintained at 1800° C. for one hour.

A battery was assembled in the same manner as in Example 1.

Also, the positive electrode was subjected to the same electrolysis treatment as the negative electrode prior to assembling into the battery to have Li with a capacity of 5 mAh carried thereon. The electrolysis treatment conditions were a bath temperature of 20° C. and a current density of 0.5 mA/cm². Thus, a button type secondary battery as shown in FIG. 1 was prepared.

(4) Characteristics of Battery

For the battery thus prepared, charging and discharging were repeated at a constant current of 800 μA within the range of the battery voltage between the upper limit of 3.3 V and the lower limit of 1.8 V for cycle evaluation. The performances at the 10th cycle and the 90th cycle are shown in Table 5.

Also, after completion of charging at the 10th cycle, the battery was left to stand with the circuit being opened for 60 days and thereafter discharging at the 11th cycle was practiced. The performances at the 10th cycle and 11th cycle are shown in Table 6.

The internal resistance of the battery was found to be 15 immediately after assembling of the battery, and 17 after 6 cycles of charging and discharging were repeated.

COMPARATIVE EXAMPLE 8

(1) Preparation of Positive Electrode

A positive electrode was prepared in the same manner as in Example 9.

(2) Preparation of Negative Electrode

By use of only the carbonaceous material prepared in the same manner as in Example 9, a carrier pellet was prepared in the same manner as in Example 9 except for carrying out no pyrolysis by contact with the organic aluminum.

This was subjected to the same electrolysis treatment as in Example 9 to have 12 mAh of Li carried thereon to provide a negative electrode.

(3) Assembly of Battery

A battery was assembled in the same manner as in Example 9.

(4) Characteristics of Battery

The battery characteristics were measured under the same conditions similarly as in Example 9, and the results are also shown in Table 5 and Table 6.

The internal resistance of the battery immediately after assembling of the battery was found to be 18Ω, and the internal resistance of the battery after elapse of 6 cycle of charging and discharging was 34Ω.

TABLE 5

| | 10 cycle | | | 90 cycle | | |
|---|---|---|---|---|---|---|
| | Charged amount (mAh) | Discharged amount (mAh) | Coulomb efficiency (%) | Charged amount (mAh) | Discharged amount (mAh) | Coulomb efficiency (%) |
| Example 9 | 12.8 | 12.6 | 98.4 | 12.7 | 12.5 | 98.4 |
| Comparative example 8 | 9.1 | 8.9 | 97.8 | 9.0 | 8.8 | 97.8 |

TABLE 6

| | 10 cycle | | | 11 cycle | | |
|---|---|---|---|---|---|---|
| | Charged amount (mAh) | Discharged amount (mAh) | Coulomb efficiency (%) | Charged amount (mAh) | Discharged amount (mAh) | Coulomb efficiency (%) |
| Example 9 | 12.8 | 12.6 | 98.4 | 12.8 | 12.2 | 95.6 |
| Comparative example 8 | 9.1 | 8.9 | 97.8 | 9.1 | 8.2 | 90.1 |

EXAMPLE 10

(1) Preparation of Positive Electrode 9 g of $V_2O_5$ powder and 2.5 g of $(NH_4)_3PO_4.3H_2O$ powder (24 mole % based on $V_2O_5$) were mixed, and the mixture was melted at 800° C. for 4 hours. The melted product obtained was quenched by flowing down on a copper plate cooled with dry ice, and then crushed into an average particle size of 100 μm. The powder obtained was found to be amorphous by identification according to the X-ray diffraction method.

A mixture of 5 g of powder of the amorphous product, 0.5 g of powdery polytetrafluoroethylene and 0.5 g of Acetylene Black as the electroconductive agent was kneaded, and the kneaded product obtained was roll molded into a sheet with a thickness of 0.4 mm.

One surface of this sheet was pressure adhered onto a stainless steel net of 60 mesh with a wire diameter of 0.1 mm which is a current collector to provide a positive electrode.

(2) Preparation of Negative Electrode

Powder of a carbonaceous material was prepared in the same manner as in Example 1.

The powder of the carbonaceous material (average particle size: 15 μm) was mixed with 10% by weight of Al powder (average particle size: 5 μm). After the mixture was mixed with 5% by weight of polyethylene powder with an average particle size of 5 μm, the resultant mixture was compression molded into a negative electrode shaped in pellet with a thickness of 0.5 mm.

(3) Assembly of Battery

A battery was assembled in the same manner as in Example 1.

Prior to incorporation into the battery, the negative electrode was immersed in an electrolyte of Li ion at a concentration of 1 mole/liter, and subjected to the electrolysis treatment with the negative electrode as the anode and lithium as the cathode. The electrolysis treatment was conducted under the conditions of a bath temperature of 20° C., a current density of 0.5 mA/cm² and an electrolysis time of 48 hours to have Li with capacity of 23 mAh carried on the negative electrode.

Also, the same electrolysis treatment was effected on the positive electrode to have Li with capacity of 16.0 mAh carried thereon. The electrolysis treatment conditions at this time were a bath temperature of 20° C., a current density of 0.5 mA/cm² and an electrolysis time of 25 hours.

Thus, a button-type secondary battery as shown in FIG. 1 was prepared.

(4) Characteristics of Battery

For the battery thus prepared, charging was effected at a constant current of 250 μA until the battery voltage became 3.3 V, and then 5 cycles of preliminary charging and discharging were practiced at a constant current of 250 μA with potential regulations of the upper limit of 3.3 V and the lower limit of 1.8 V. The discharging capacity at the 5th cycle was 12 mAh when the final voltage was made 2.0 V. This capacity was made the initial capacity.

Figure 8:
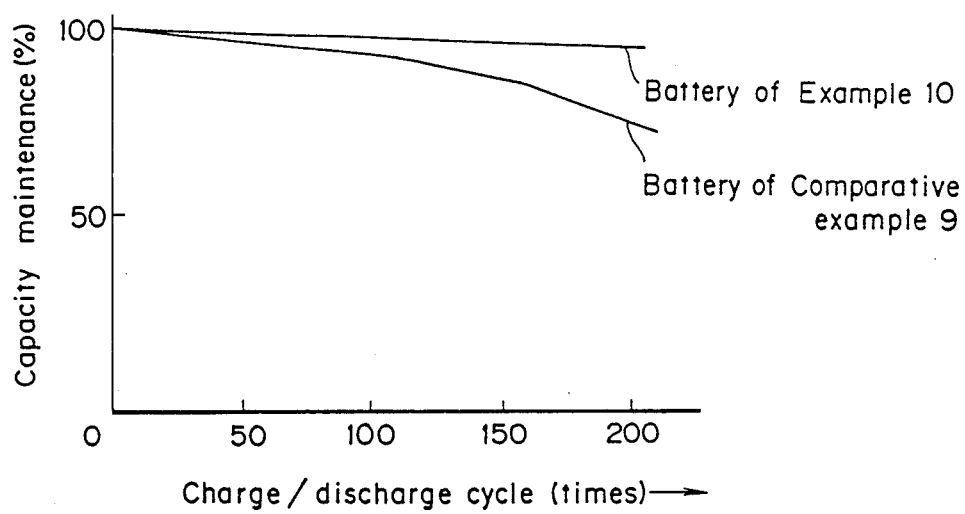

Then, for performing charging and discharging cycle evaluation during large current, charging and discharging were repeated at a constant current of 1 mA with potential regulations of the upper limit of 3.3 V and the lower limit of 1.8 V, and the maintenance of the discharging capacity relative to the initial capacity when the final voltage was made 2.0 V was measured for cycle evaluation. The results are shown in FIG. 8.

Figure 9:
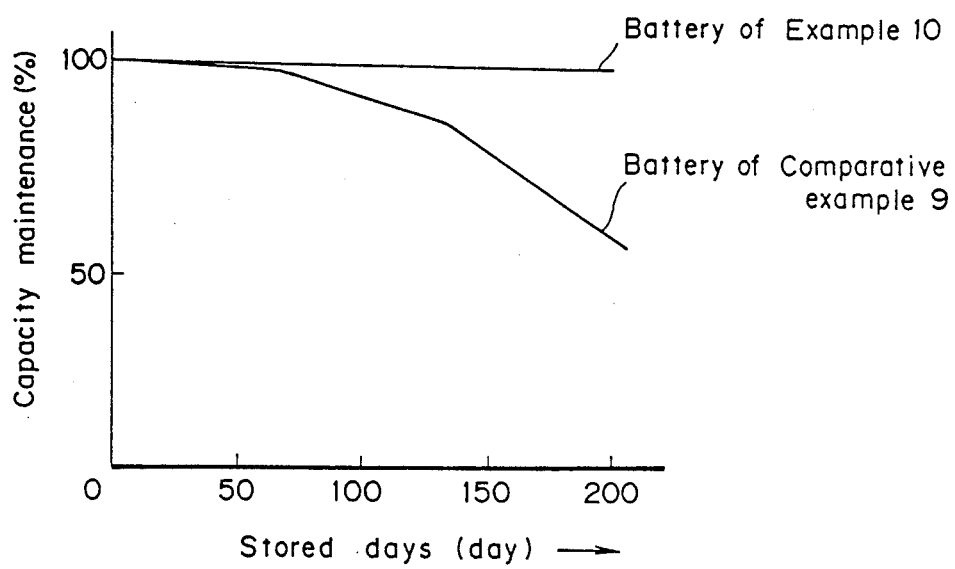

Further, self-discharging evaluation test during storage at 20° C. was performed, and the capacity maintenance relative to the capacity before storage was measured to obtain the results shown in FIG. 9.

COMPARATIVE EXAMPLE 9

(1) Preparation of Positive Electrode

A positive electrode was prepared in the same manner as in Example 10.

(2) Preparation of Negative Electrode

By use only of the carbonaceous material prepared in the same manner as in Example 10, a negative electrode was prepared in the same manner as in Example 1 except for adding no Al powder.

(3) Assembly of Battery

A battery was assembled in the same manner as in Example 10.

(4) Characteristics of Battery

The battery characteristics were measured under the same conditions similarly as in Example 10 to obtain the results shown in FIG. 8 and FIG. 9. The initial capacity was 8 mAh.

EXAMPLE 11

(1) Preparation of Positive Electrode

A positive electrode was prepared in the same manner as in Example 10.

(2) Preparation of Negative Electrode

Powder of carbonaceous material was obtained in the same manner as in Example 1.

The powder of the carbonaceous material (average particle size: 15 $\mu$m) was mixed with 11% by weight of Li/Al alloy powder (330 mesh under) with 18.4% by weight of Li content. The mixture was mixed with 7% by weight of polyethylene powder with an average particle size of 5 $\mu$m, and then compression molded into a negative electrode shaped in a pellet with a thickness of 0.5 mm.

Subsequently, the pellet was immersed in an electrolyte of Li ion at a concentration of 1 mole/liter, and subjected to the electrolysis treatment with the negative electrode pellet as the anode and metallic lithium as the cathode. The electrolysis treatment was carried out under the conditions of a bath temperature of 20° C., a current density of 0.5 mA/cm$^2$ and an electrolysis time of 10 hours.

On the negative electrode (pellet) was carried 10 mAh of Li by this treatment combined with Li previously contained in the Li/Al alloy.

(3) Assembly of Battery

A battery was assembled in the same manner as in Example 1.

Also, the positive electrode was subjected to the same electrolysis treatment prior to incorporation into the battery to have Li with a capacity of 2.0 mAh carried thereon. The electrolysis treatment conditions at this time were a bath temperature of 20° C., a current density of 0.5 mA/cm$^2$ and an electrolysis time of 7 hours.

Thus, a button type secondary battery as shown in FIG. 1 was prepared.

(4) Characteristics of Battery

For the battery thus prepared, charging was effected at a constant current of 250 $\mu$A until the battery voltage became 3.3 V, and then 5 cycles of preliminary charging and discharging were practiced at a constant current of 250 $\mu$A with potential regulations of the upper limit of 3.3 V and the lower limit of 1.8 V. The discharging capacity at the 5th cycle was 11 mAh when the final voltage was made 2.0 V. This capacity was made the initial capacity.

Figure 10:
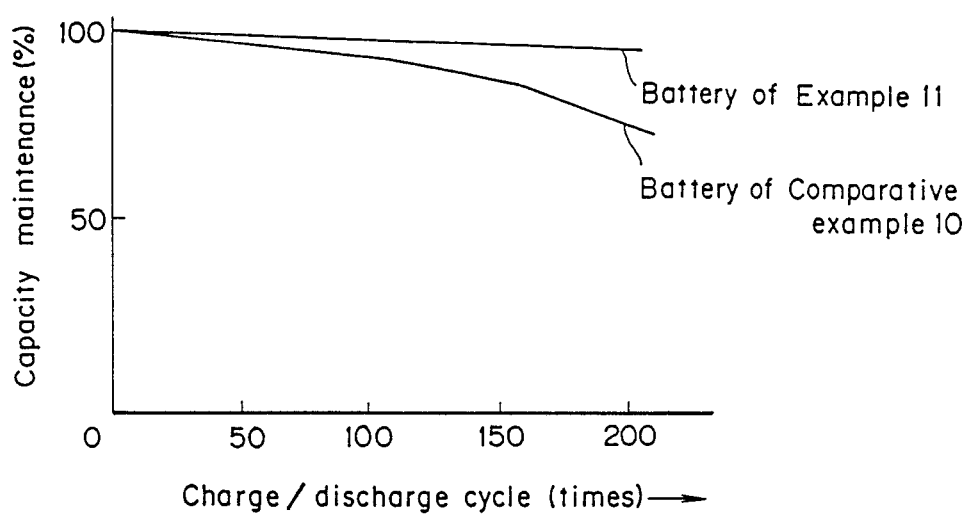

Then, for performing charging and discharging cycle evaluation during large current, charging and discharging were repeated at a constant current of 1 mA with potential regulations of the upper limit of 3.3 V and the lower limit of 1.8 V, and the maintenance of the discharging capacity relative to the initial capacity when the final voltage in each cycle was made 2.0 V was measured for cycle evaluation. The results are shown in FIG. 10.

Figure 11:
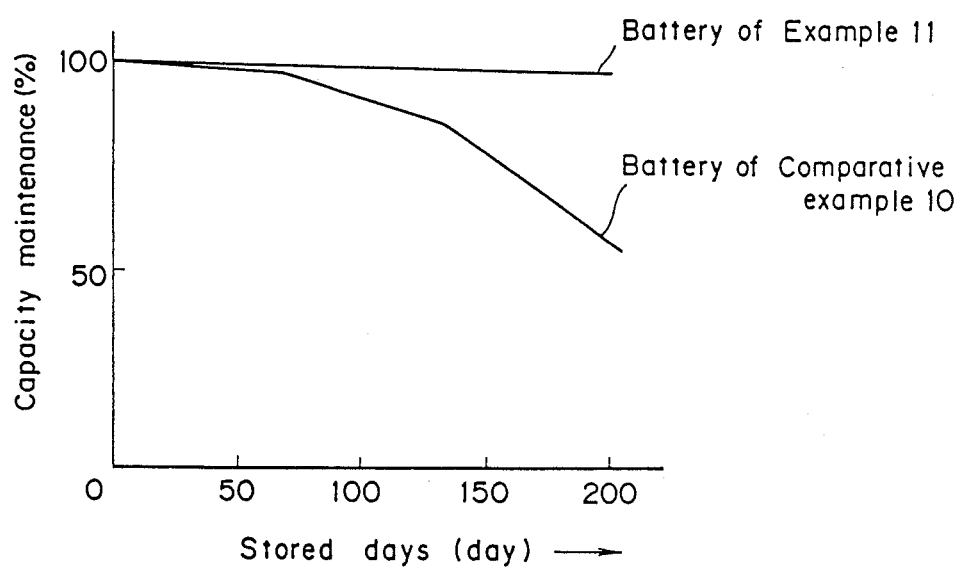

Further, self-discharging evaluation test was conducted during storage at 20° C., and the maintenance relative to the capacity before storage was measured to obtain the results shown in FIG. 11.

COMPARATIVE EXAMPLE 10

(1) Preparation of Positive Electrode

A positive electrode was prepared in the same manner as in Example 11.

(2) Preparation of Negative Electrode

By use only of the carbonaceous material prepared in the same manner as in Example 11, a negative electrode pellet was prepared in the same manner as in Example 11 except for adding no Li/Al alloy powder, and the electrolysis treatment was carried out under the same conditions as in Example 11 to have Li carried thereon. The amount of Li carried on this negative electrode was 10 mAh.

(3) Assembly of Battery

A battery was assembled in the same manner as in Example 11.

(4) Characteristics of Battery

The battery characteristics were measured under the same conditions similarly as in Example 11 to obtain the results shown in FIG. 10 and FIG. 11.

As is apparent from the above description, the secondary battery of the present invention has long charging and discharging cycle life, and also Li or an alkali metal composed mainly of Li which is the active substance can be fixed in a stable form on a negative electrode, and therefore stable high capacity, namely large current discharging becomes possible, and further self-discharging characteristics is also good to give a battery of high reliability, and its industrial value is great.

Having described above about the secondary battery with a button type structure, the technical thought of the present invention is not limited to this structure, but it is also applicable to secondary batteries with shapes such as cylindrical, flat, angular shapes, etc.

We claim:

1. In a secondary battery having a negative electrode composed of an active substance and a carrier carrying said active substance, the improvement wherein
(1) said active substance is lithium or an alkali metal mainly composed of lithium,
(2) said carrier is a mixture composed of
   (a) a carbonaceous material having
      (i) an atomic ratio of hydrogen/carbon of less than 0.15 and
      (ii) a spacing of (002) planes ($d_{002}$) as determined by X-ray wide angle diffraction of 3.37 Å or more and a crystallite size in the direction of c axis of 150 Å or less, and
   (b) an alloy including said active substance and/or a metal capable of forming an alloy with said active substance.

2. The secondary battery according to claim 1, wherein a formulating amount of the carbonaceous material in the mixture is 10 to 97% by weight.

3. The secondary battery according to claim 2, wherein a formulating amount of the carbonaceous material in the mixture is 40 to 95% by weight.

4. The secondary battery according to claim 3, wherein a formulating amount of the carbonaceous material in the mixture is 50 to 93% by weight.

5. The secondary battery according to claim 1, wherein a volume average diameter of particles of the carbonaceous material is 100 μm or less and a specific surface area thereof is 1 m$^2$/g or more.

6. The secondary battery according to claim 1, wherein said metal which is capable of being alloyed with said active substance and/or said alloy including said active substance is/are powder having a volume average particle size of 30 μm or less.

7. The secondary battery according to claim 1, wherein a total pore volume of said carbonaceous material is $1.5 \times 10^{-3}$ ml/g or more.

8. The secondary battery according to claim 1, wherein an average pore radius is 8 to 100 Å.

9. The secondary battery according to claim 1, wherein the mixture is a uniform mixture.

10. The secondary battery according to claim 1, wherein said carbonaceous material has a two-fold distance $a_0$ of a spacing ($d_{110}$) of (110) planes in X-ray wide angle diffraction being 2.38 Å to 2.47 Å.

11. The secondary battery according to claim 1, wherein said carbonaceous material has a crystallite size La in the direction of a-axis being 10 Å or more.

12. The secondary battery according to claim 1, wherein said carbonaceous material has the atomic ratio of hydrogen/carbon of less than 0.15, the spacing ($d_{002}$) of (002) planes of 3.39 to 3.75 Å and the crystalline size in the direction of c axis of 5 to 150 Å.

13. The secondary battery according to claim 1, wherein said carbonaceous material has the atomic ratio of hydrogen/carbon of less than 0.10, the spacing ($d_{002}$) of (002) planes of 3.41 to 3.70 Å, the crystallite size in the direction of c axis of 10 to 80 Å, a two-fold distance $a_0$ of a spacing ($d_{110}$) of (110) planes in X-ray wide angle diffraction of 2.38 Å to 2.47 Å and a crystallite size in the direction of a-axis of 2.39 to 2.46 Å.

14. The secondary battery according to claim 1, wherein said metal capable of forming an alloy with said active substance is at least one selected from the group consisting of Al, Pb, Bi and Cd.

15. The secondary battery according to claim 1, wherein said alloy with said active substance is an alloy of Li and at least one selected from the group consisting of Al, Pb, Bi and Cd.

16. The secondary battery according to claim 1, wherein said carrier is obtained by mechanically mixing carbonaceous material powder and powder of the metal capable of forming an alloy with the active substance and/or the powder of the alloy of the active substance.

17. The secondary battery according to claim 1, wherein said carrier is obtained by coating the metal capable of forming an alloy with the active substance and/or an alloy with the active substance on the surface of the carbonaceous material.

18. The secondary battery according to claim 1, wherein said carrier is obtained by mixing an organic compound and an organometallic compound containing the metal capable of forming an alloy with the active substance and then pyrolyzing the mixture.

19. The secondary battery according to claim 1, wherein said carrier is obtained by contacting an organometallic compound containing a metal capable of forming an alloy with the active substance, with the carbonaceous material and then pyrolyzing the organometallic compound.

20. The secondary battery according to claim 1 wherein a volume average diameter of particles of the carbonaceous material is 1 μm to 150 μm.

21. The secondary battery according to claim 1, wherein said metal which is capable of being alloyed with said active substance or an alloy of said active substance is powder having a volume average diameter of particles not more than a volume average diameter of the carbonaceous material.

* * * * *